April 23, 1968 W. R. HRAZANEK 3,379,590
METHOD OF MAKING A WRINKLE-FREE ENDLESS FABRIC FILTER BELT
Filed April 7, 1965 4 Sheets-Sheet 3

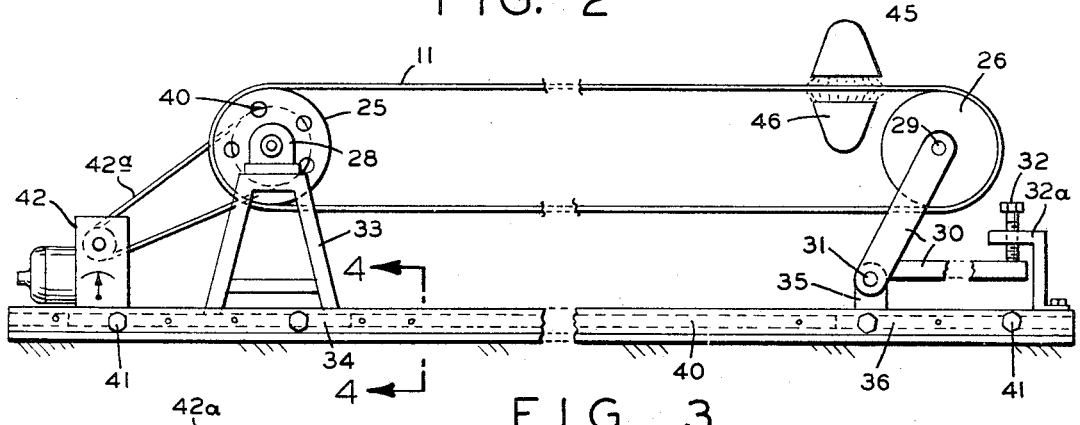
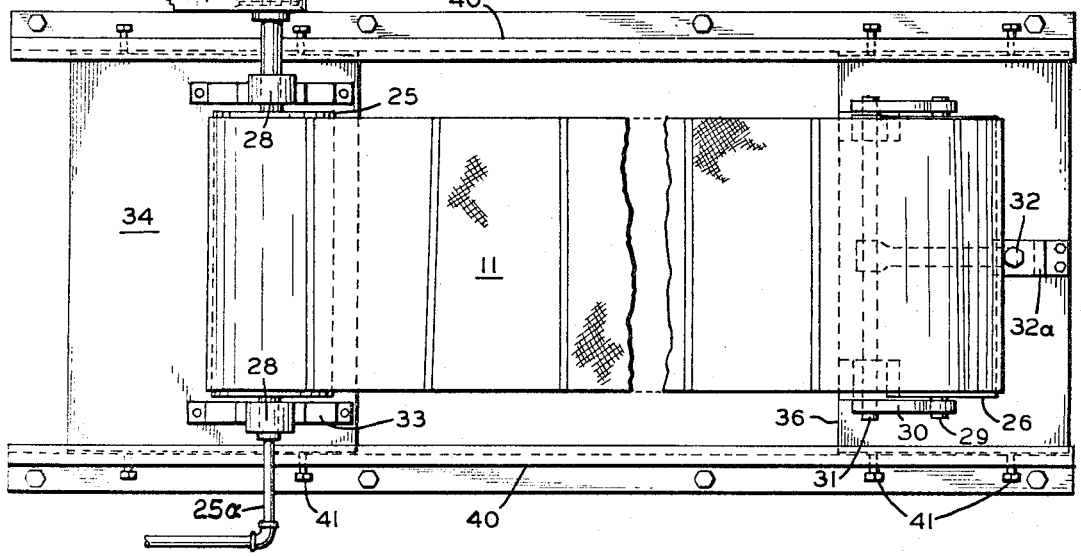
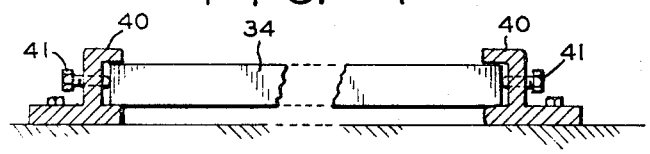
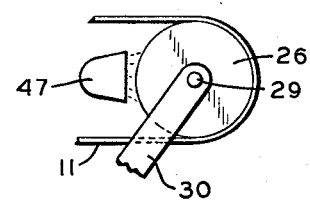

INVENTOR.
WILLIAM R. HRAZANEK
BY
George Hastings
ATTORNEY.

April 23, 1968  W. R. HRAZANEK  3,379,590
METHOD OF MAKING A WRINKLE-FREE ENDLESS FABRIC FILTER BELT
Filed April 7, 1965  4 Sheets-Sheet 4
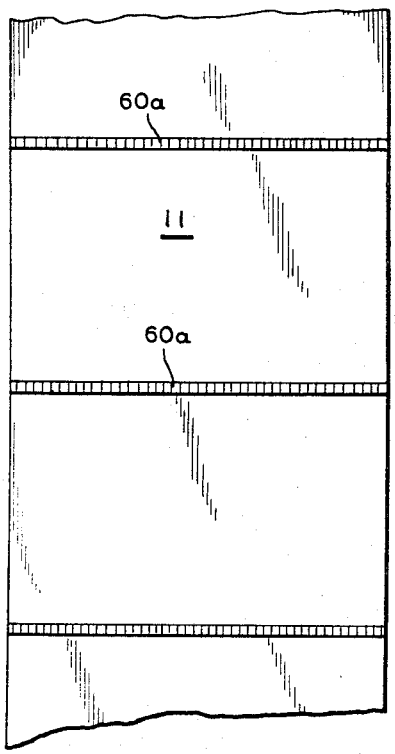
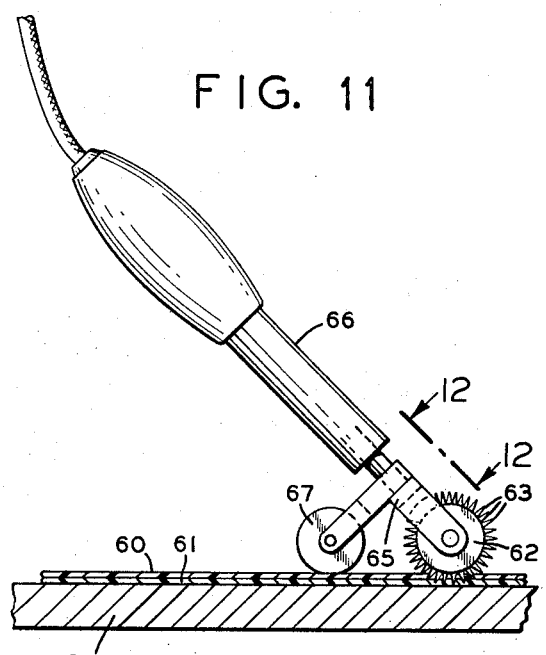
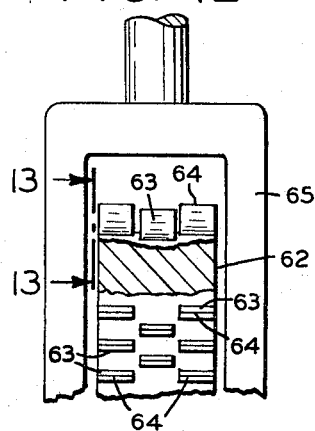
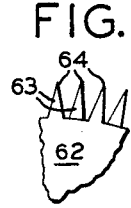
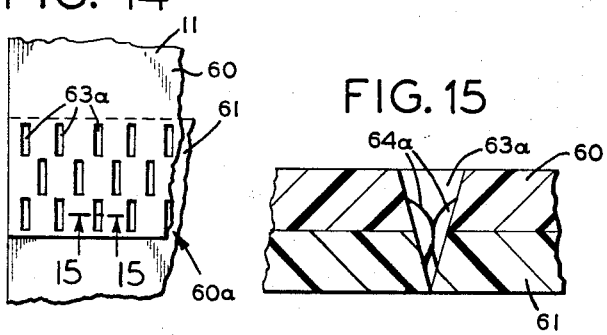
INVENTOR.
WILLIAM R. HRAZANEK
BY
George S Hastings
ATTORNEY.

United States Patent Office 3,379,590
Patented Apr. 23, 1968

3,379,590
METHOD OF MAKING A WRINKLE-FREE
ENDLESS FABRIC FILTER BELT
William R. Hrazanek, Wilton, Conn., assignor to Dorr-Oliver Incorporated, Stamford, Conn., a corporation of Delaware
Filed Apr. 7, 1965, Ser. No. 446,237
10 Claims. (Cl. 156—84)

ABSTRACT OF THE DISCLOSURE

A method of mechanically and thermally treating a thermoplastic fiber belt filter to remove wrinkles, to even out the dimensions, and to ease tracking. The belt filter is stretched over a set of rollers, heated to the glass transition temperature and cooled to the desired shape.

This invention relates to endless traveling filter belts such as are used in connection with rotary drum vacuum filters or horizontal belt filters. The general purpose of this invention is to provide such a belt made of thermoplastic fibers which is free from some of the difficulties now found with such belts, particularly the wide belts used on very wide filters, which offer special difficulties in tracking and in keeping the belts smooth.

Thus, it is an object of this invention by means of heat treatment and mechanical means, to remove irregularities in form such as wrinkles, and to shape the material of the belt so that all portions of this belt are of the same length and the belt is smooth and free of wrinkles thus avoiding loss of suction and making tracking easy.

Traveling belt filters because of their large width which may be up to 20 or 30 feet are commonly made of a multiplicity of panels cut from bolts of woven fabric of indefinite length, much narrower than the belt. These panels are commonly cut to a length a little greater than the width of the belt to provide for shrinkage and edge trimming, and are sewn together along their longitudinal edges to form a belt of desired width and length. During the sewing operation the stitching thread forms a seam which being under some tension pulls the meshes of the cloth together. As a result of this, the width of the cloth at the seams becomes shorter than it is in the mid portions of the panels away from the seams. This in turn results in puckering or wrinkling of the cloth. Also, it is almost impossible for the people who secure the panels together to position the panels and form the cloth into a belt with such accuracy that the opposite edges of the completed belt are equal in length. Thus, the belt being slightly conical in shape becomes difficult to track. This has resulted in the use of complicated and expensive tracking devices which sense the edges of the belt and vary the angularity of guide rolls. These sensing devices also produce wear on the edges of the belt. It is the object of the invention to provide a belt and a guide structure which solves these problems.

It has been known to heat shrink the thermoplastic yard goods or bolt lentgh fabric from which the filter belts are made, prior to assembly into a belt, but this has not solved the difficulties above mentioned. In accordance with the present invention a method and apparatus is provided by which the filter belt, after it has been assembled from narrow lengths of the fabric by transverse seams or stitches, is stretched to the point where all wrinkles are eliminated and the edges are of the same length and is then heat treated sufficiently to set the thermoplastic fabric fibers in their stretched, equal edge length and unwrinkled belt condition. This heat treating is in addition to the prior heat shringing of the bolt length fabric before assembly into a belt. The result is to produce an even greater resistance to the shrinkage that ordinarily occurs after the filter belt is subjected to the wet slurries being handled by the filter.

It is also part of the invention to provide a simple positive means for guiding a central portion of the belt, in combination with the accurately dimensional wrinkle-free heat treated belt, so as to maintain the free lateral portions of the belt in proper vacuum-tight relationship to the vacuum drum even though guided at the center only.

A further feature of the filter belt of the invention is the method of securing together the overlapping edge portions of thermoplastic filter fabric panels by piercing or slitting with a hot piercing tool to fuse the thus exposed internal edges together, and thus positively weld the overlapped fabric portions together. This avoids a good part of the wrinkle producing transverse tension caused by sewing and makes a simple central guidance system more efficient. It also provides a high tensile strength seam which retains its strength under the adverse conditions of heat, wetness and corrosive chemicals to which filter belts are subject.

In the drawings, FIGURE 1 is a perspective view showing the subject filter belt in operation on a vacuum drum endless belt filter.

FIGURE 2 represents a side elevation of an apparatus for practicing the method.

FIGURE 3 is a plan view of the equipment shown in FIGURE 2.

FIGURE 4 is a detail of the apparatus showing how the supports for the rolls may be adjusted as to parallelism, taken along the section line 4—4 of FIGURE 2.

FIGURE 5 is a side view of the details showing how the rolls and belt are heated by a radiant heater.

FIGURE 6 shows the belt as it appears after stitching.

FIGURE 7 shows the tendency to wrinkle at this stage prior to treatment in accordance with the invention.

FIGURE 9 illustrates the stretched and heat-treated assembled belt free from wrinkles and with edges stretched to the same length despite lack of parallelism between the seams.

FIGURE 10 is a plan view of the thermoplastic belt with heat stitched seams.

FIGURE 11 is a side elevation, partly in section showing the heat stitching tool.

FIGURE 12 is a detail view along line 12—12 of FIGURE 11.

FIGURE 13 is a fragmentary view along line 13—13 of FIGURE 12.

FIGURE 14 is an enlarged plan view of a portion of the heat stitched seam.

FIGURE 15 is a sectional view along the line 15—15 of FIGURE 14.

Figure 1:
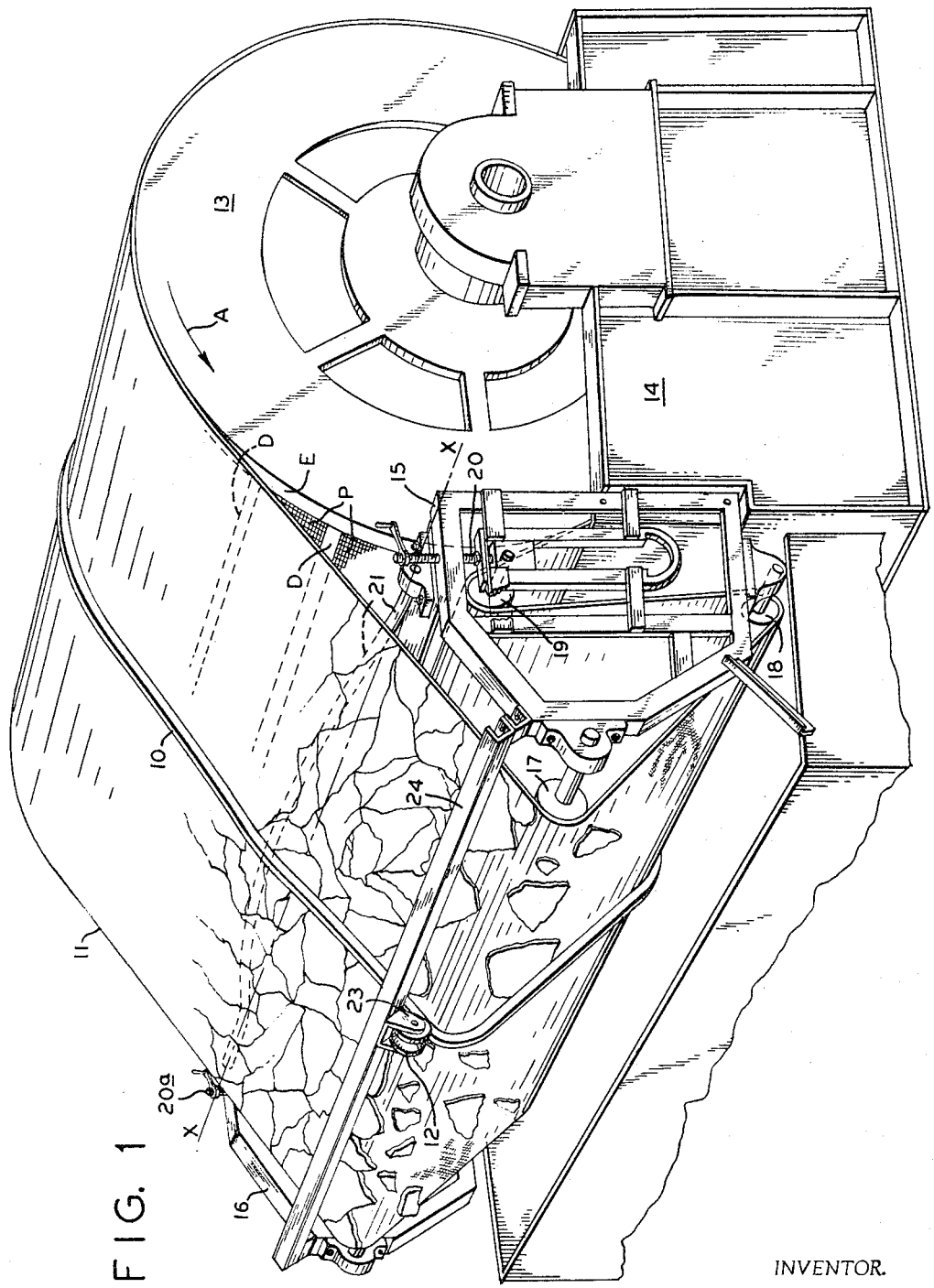

Referring now to the drawings, FIGURE 1 illustrates the filter belt as used in a drum filter consisting of side frames 14 supporting side discs 13 on which are mounted cross bars D supporting screens P. The fabric filter belt 11 is trained over pulleys 17, 18 and 19 supported in side frames 15 connected by cross bar 24. Vacuum is sealed in by engagement of the belt with edges of the side disc E, the drum as a whole turning in the direction A. To help break a filter cake formed on the belt a curved bar 21 bows the belt and the cake is ejected as it passes over roll 17. Means are provided for guiding the belt consisting of a projecting rib or V-belt which is secured to the finished belt longitudinally thereof along the mid portion of the belt and which is positively guided by V-roller 12 mounted in bracket 23 on cross-bar 24.

Thus, by providing a flat non-wrinkling equal edge length belt for easy tracking, it is possible to track the belt very simply by means of the V-belt 10 and the V-pulley 12, without the tendency to independent weaving in and out of the belt edges, which would produce wrinkling and without any of the complex edge guiding mechanisms heretofore thought necessary on wide endless belt vacuum filters.

Figure 6:
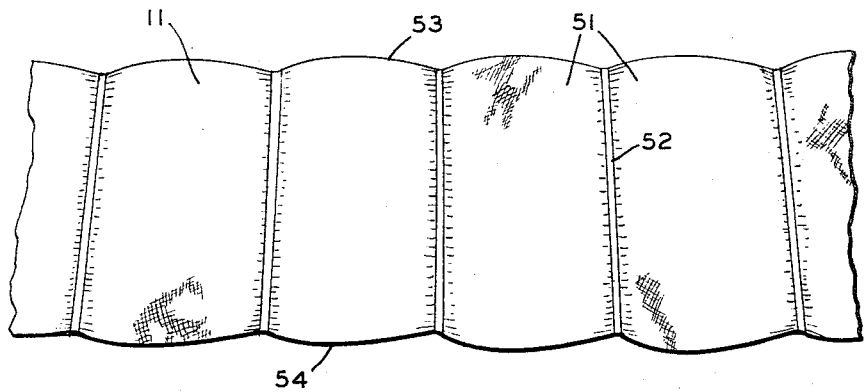
FIGURES 6, 7 and 9 illustrate the various stages in the assembly and treatment of the filter belt.
Figure 7:
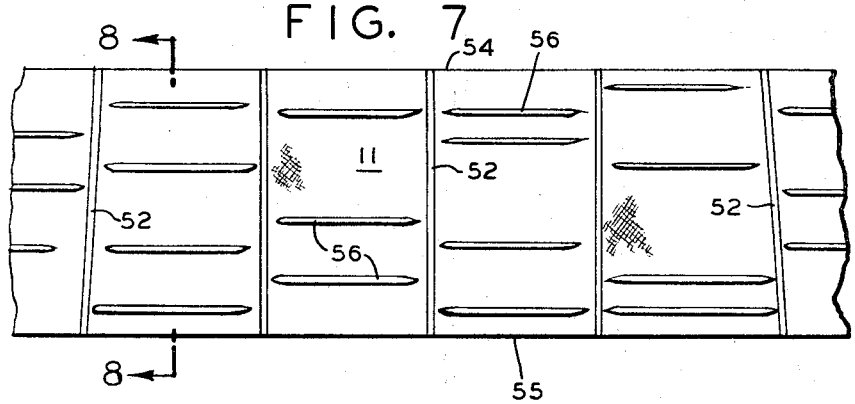
Figure 9:
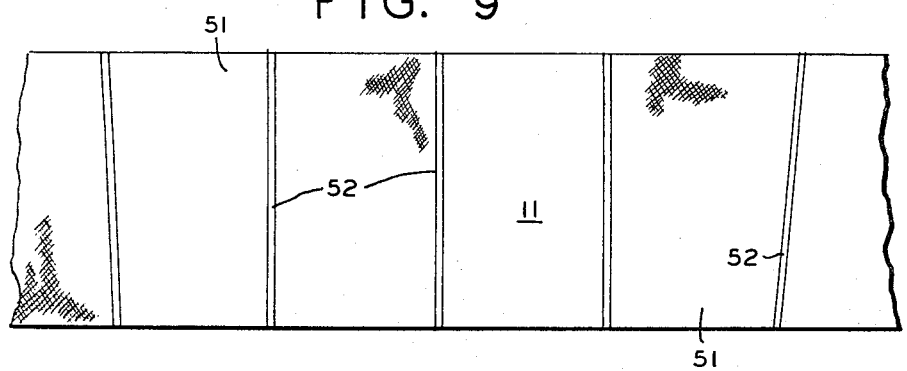
Figure 8:
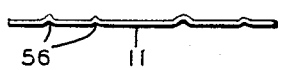
FIGURE 8 is a cross-sectional view on line 8—8 through FIGURE 7.

Wide filter belts are commonly made by cutting lengths of heat-shrunk thermoplastic synthetic fiber such as saran to a length a little more than the width of the desired belt and stitching these cut panels 51 as shown in FIGURE 6 together to form the belt. Because of the gathering or puckering effect produced by the tension of the stitching 52, belts tend to take a scalloped form shown somewhat exaggerated for purposes of illustration at 53 and 54 in FIGURE 6. When such a belt is stretched as over the vacuum drum the edges may straighten out as shown in FIGURE 7 but the material tends to form wrinkles as shown at 56. Moreover, one edge, being frequently shorter than the other, is under more tension and the belt tends to ride off the drum and pulleys.

In order to overcome these difficulties, applicant provides the apparatus shown in FIGURE 2 in which the assembled belt 11 is trained over pulleys 25 and 26 which are parallel with each other and which are mounted respectively on bearings 28 and 29 for rotation. Pulley 26 and its bearing 29 are mounted on a bell crank 30 pivoted at 31 and has a fine adjustment toward and away from pulley 25 by set screw 32 in bracket 32a to stretch the belt 11 under controlled tension. A hollow pulley 25 is supported by bearings 28 on side frames 33 mounted for coarse longitudinal adjustment to fit different lengths of belt track 40, in which the support plates 34 and 36 ride with substantial side play so that their parallelism may be given a fine adjustment by means of set screws 41 which also serve to lock the plates 34 and 36 against longitudinal movement in the tracks.

After heat setting and while stretched on pulleys 25 and 26 the edges of the belt are trimmed or marked for subsequent trimming, to desired width with the edges parallel straight and of equal length. This avoids the difficulties in tracking and maintaining the belt smooth, due to shrinkage of the panels after use with resulting wrinkles and wavy edges.

In order to heat the belt 11 to the point where the thermoplastic fibers soften and on cooling the belt can take a permanent set, radiant heating elements 45 and 46 may be provided as shown in FIGURE 2, or a radiant heater may be provided at the pulley as shown at 47 in FIGURE 5. However, it is preferred to heat one of the pulleys by a gas flame within the hollow pulley supplied by gas pipe 25a. Pulley 25 is driven by a variable speed drive and motor 42 through belt 42a and pulley 40, to subject the belt to heating for selected periods of time.

For example, in the treatment of a belt made of National Filter Media Corporation's MS–998, saran filter cloth was treated on the apparatus at a temperature of 180° for six minutes while under a tension of between 2 and 10 lbs. per inch, preferably 5 lbs. per inch of width of the belt. It will be understood that for different thermoplastic synthetic materials, somewhat different times, tensions and temperatures, the temperatures ranging between about 160° and 400°, are required to first soften the material to the glass transition temperature of the thermoplastic material and then on cooling set it in stretched, straight and wrinkle-free condition, with both edges of equal length.

After completion of the heat treating and stretching operation the guide belt 10 is thereafter secured to the belt 11 by any suitable means, preferably by a suitable adhesive. If the edges are of the same length, and the belt is wrinkle free, it has been found that excellent results can be obtained on wide belts though the belt is only guided by guide member 10 and guide roller 12 without wrinkles and consequent loss of suction despite the free width of belt on either side of the central guiding means.

As the preferred alternate to sewing, the panels are secured together by heat welding or stitching as illustrated in FIGURES 10 to 15. The overlapped edges 60 and 61 resting on a backing plate 61a are heat stitched or welded by means of a heated roller 62 having radially extending teeth 63 with cutting edges 64 the length of which extend axially of the roller. As the roller travels along the overlapped edges of the fabric, it cuts a slit 63a through both overlapped edges and fuses the exposed cut edges of the under and over lap together at 64a thus producing a positive weld. The roller is supported in a copper yoke 65 which transmits heat to the roller from a soldering iron handle and heating unit 66. Also secured to the yoke and heated thereby is a smooth follower roll 67. The cuts extend longitudinally of the belt and tend to close so as to prevent leakage, as a result of longitudinal belt tension instead of opening as they would if transverse to the belt. This thermal stitching has as one of its advantages largely eliminating lateral seam tension, and thus the tendency to wrinkle.

As an additional precaution against leakage the heater follower roll secured in tandem in relation to the toothed roll applies heat and pressure to further close the heat softened edges of the cut.

While the invention has been described with reference to specific procedures and embodiments, there is no intent to limit the spirit or scope of the invention to the particular details so set forth.

Wha I claim is:

1. The method of making a readily trackable, wrinkle-free endless fabric filter belt comprising:
   (a) cutting predetermined lengths from a bolt of thermoplastic filter fabric the width of which is less than the width of the fiber belt;
   (b) securing a plurality of said lengths together along their longitudinal edges along seams extending transversely of the length of said belt to assemble a filter belt of desired width and length;
   (c) stretching said belt until it is substantially free from wrinkles and other seam caused distortions; and
   (d) heating said belt while so stretched at a temperature and for a time sufficient to set the thermoplastic fabric of the belt in a wrinkle free condition.

2. The method according to claim 1, in which said temperature is at the glass transition temperature of said thermoplastic fabric.

3. The invention according to claim 1 in which the belt is stretched to a tension of between 2 and 10 pounds per inch of width of said belt.

4. The invention according to claim 1 in which said lengths are sewed together.

5. The invention according to claim 1 in which said lengths are heat fused together.

6. The method according to claim 1 wherein said seams are formed by a heat welding process comprising:

(a) overlapping adjoining edges;
(b) piercing the overlapping portions;
(c) heating the overlapping portions at a temperature sufficient to fuse together the overlapped portions exposed by the piercing.

7. The invention according to claim 1 in which said fabric is heat shrunk prior to assembly into said endless belt.

8. The method according to claim 1 which includes the step of trimming the longitudinal edges of the belt after the belt has been heat set to the desired width and with its edges parallel and of equal length.

9. The invention according to claim 1 wherein the belt is stretched by being wound over a plurality of rollers, at least one of said rollers being heated to provide at least a portion of the temperature required to set the thermoplastic fabric of the belt in a wrinkle free condition.

10. The invention according to claim 9 wherein at least one of said rollers is driveable and can thus advance the belt over the rollers.

References Cited
UNITED STATES PATENTS

| | | | |
|---|---|---|---|
| 2,067,647 | 1/1937 | Potts | 156—93 XR |
| 2,688,582 | 9/1954 | Phair et al. | 156—252 XR |
| 2,477,040 | 7/1949 | Brown et al. | 156 |
| 1,281,153 | 10/1918 | Gates | 156—137 |
| 2,737,701 | 3/1956 | Hubbard et al. | 156—85 X |
| 2,386,761 | 10/1945 | Wetherbee | 156 |
| 2,712,987 | 7/1955 | Storrs et al. | 156—137 X |
| 2,592,463 | 4/1952 | Phillips | 156 |

FOREIGN PATENTS

| | | |
|---|---|---|
| 584,317 | 1/1947 | Great Britain. |

EARL M. BERGERT, *Primary Examiner.*

PHILIP DIER, *Examiner.*